US006957331B2

(12) United States Patent
Kursawe et al.

(10) Patent No.: US 6,957,331 B2
(45) Date of Patent: Oct. 18, 2005

(54) METHOD OF ACHIEVING MULTIPLE PROCESSOR AGREEMENT IN ASYNCHRONOUS NETWORKS

(75) Inventors: Klaus Kursawe, Rueschlikon (CH); Victor Shoup, Zurich (CH); Christian Cachin, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 09/759,127

(22) Filed: Jan. 12, 2001

(65) Prior Publication Data

US 2001/0039630 A1 Nov. 8, 2001

(51) Int. Cl.[7] .............................. H04L 9/00; H04K 1/00; G06F 7/58; G06F 11/00
(52) U.S. Cl. .................. 713/163; 713/176; 380/28; 708/250; 714/4; 714/10
(58) Field of Search ................... 713/150, 162, 713/163, 168, 176; 380/28, 44, 277; 714/10–12, 4, 47; 708/100, 200, 250; 709/204–207, 223, 224

(56) References Cited

U.S. PATENT DOCUMENTS

| 6,754,845 B2 * | 6/2004 | Kursawe et al. ............... 714/4 |
| 2002/0129087 A1 * | 9/2002 | Cachin et al. ............. 709/200 |
| 2004/0156507 A1 * | 8/2004 | Dellow et al. ............. 380/277 |
| 2004/0254967 A1 * | 12/2004 | Cachin ....................... 708/250 |

OTHER PUBLICATIONS

Feldman et al, "Optimal Algorithms for Byzantine Agreement" 1998, ACM, pp 148–161.*
Krings et al, "A Byzantine Resilient Approach to Network Security" 1999, pp 1–2.*
Zamsky, "A Randomized Agreement Protocol with Constant Expected Time and Guaranteed Termination in Optimal (Deterministic) Time", 1996, ACM, pp 201–208.*
Cachin et al, "Random Oracles in Constantinople: Practical Asynchronous Byzantine Agreement using Cryptography", Aug. 14, 2000, 19th ACM Symposium on Principles of Distributed Computing, pp 1–26.*
Bellare et al, "Distributed Pseudo–Random Bit Generators—A New Way to Speed–Up Shared Coin Tossing" 1996, 15th Annual ACM Symposium on the Principles of Distributed Computing, pp 1–16.*
Cachin et al, "Secure and Efficient Asynchronous Broadcast Protocols," Mar. 7, 2001, IBM Research, pp 1–49.*

* cited by examiner

Primary Examiner—Christopher Revak
(74) Attorney, Agent, or Firm—Douglas W. Cameron; Anne Vachon Dougherty (57) ABSTRACT

Byzantine Agreement requires a set of parties in a distributed system to agree on a value even if some parties are corrupted. The invention comprises a method for achieving agreement among participating network devices in an asynchronous network is disclosed that makes use of cryptography, specifically of threshold digital signatures and a distributed coin-tossing protocol.

23 Claims, 5 Drawing Sheets

METHOD OF ACHIEVING MULTIPLE PROCESSOR AGREEMENT IN ASYNCHRONOUS NETWORKS

FIELD OF THE INVENTION

The present invention relates to a network whose processor nodes exchange information in an asynchronous fashion, and more particularly a method for achieving agreement among the processors, even in the presence of undetected faulty processors. Thus, it is applicable in a wide range of distributed computation systems, reaching from fault-tolerant database systems to intrusion tolerant e-commerce.

BACKGROUND OF THE INVENTION

Fault-tolerant systems use computer programs called protocols to ensure that the systems will operate properly even if there are individual processor failures. A fault-tolerant consensus protocol enables each processor or party to propose an action (via a signal) that is required to be coordinated with all other processors in the system. A fault-tolerant consensus protocol has as its purpose the reaching of a "consensus" on a common action (e.g., turning a switch off or on) to be taken by all non-faulty processors and ultimately the system. Consensus protocols are necessary because processors may send signals to only a single other processor at a time and a processor failure can cause two processors to disagree on the signal sent by a third failed processor. In spite of these difficulties, a fault-tolerant consensus protocol ensures that all non-faulty processors agree on a common action.

To reach consensus, consensus protocols first enable each processor or participating network device to propose an action (via a signal) that is later to be coordinated by all the processors or participating network devices in the system. The system then goes through the steps of the consensus protocol. After completing the consensus protocol steps, the common action of the consensus is determined. For example, in a flight-control system, there may be several processors, each equipped with its own sensor, that perform a calculation determining whether the aircraft needs to be moved up or down. In marginal situations, some processors may propose that the craft move up while others propose that it move down. It is important that all non-faulty processors reach consensus on the direction and therefore act in concert in moving the craft.

The problem of consensus in a distributed system in spite of the presence of arbitrary failures was introduced in the context of aircraft control applications in 1978. L. Lamport, M. Pease and R. Shostak later isolated the problem and introduced the name "Byzantine Agreement" within their article "The Byzantine Generals Problem", ACM Trans. Programming, Languages, Systems, vol. 4, no. 3, pp. 382–401, July 1982.

The "Byzantine Agreement", also referred to as t-resilient binary Byzantine Agreement where t is the number of tolerable or corrupted participants or adversaries, is specified in the following.

Let $\pi$ be a protocol for n parties or participating network devices for which each party $P_1$ has a private binary input $b_1 \epsilon \{Y, N\}$ or $\{1, 0\}$ and a transaction TID defining the content about to be decided. It is said that $\pi$ is a t-resilient binary Byzantine Agreement protocol if the following holds for all t-adversaries and for all inputs:

Validity: If no party is corrupted and all parties start transaction TID with the same input value $p \epsilon \{Y, N\}$, then all parties decide p for transaction TID.

Agreement: If one uncorrupted party outputs p for transaction TID, then no uncorrupted party decides and outputs something other than p for the same transaction.

Termination: All honest parties eventually decide.

M. J. Fischer, N. A. Lynch and M. S. Paterson showed in their article "Impossibility of distributed consensus with one faulty process", Journal of the ACM, 32(2): 374–382, April 1985, that no deterministic protocol can solve Byzantine Agreement in a fully asynchronous environment in the presence of failures.

Various types of protocols, such as synchronous, asynchronous, hybrid randomized, or deterministic protocols have been proposed whereby a few of them are addressed in the following.

Several synchronous system models have been proposed. The best reaches the deterministic optimum with min $\{f+2, t+1\}$ rounds, where t is the maximum number of corrupted parties the protocol tolerates and f the number of corruptions that really occur.

As synchrony is a strong assumption, several timing models have been introduced to make the synchrony assumption more realistic. Later protocols isolated the timing assumptions in 'failure detectors' to abstract the protocols from the network properties, but an implementation of these failure detectors still requires time-outs. Most failure-detectors work in the crash failure model only, as failure-detectors do not work well with Byzantine corruptions so far.

Concerning asynchronous protocols, the first randomized protocols to solve fully asynchronous Byzantine Agreement where designed by M. Ben-Or and independently by M. O. Rabin and disclosed in their articles "Another advantage of free choice: Completely asynchronous agreement protocol (Extended Abstract)", in Proceedings of the Second Annual ACM SIGACT-SIGOPS Symposium on Principles of Distributed Computing, pp. 27–30, Montreal, Canada, Aug. 17–19, 1983 and "Randomized Byzantine generals", In 24th Annual Symposium on Foundations of Computer Science, pp. 403–409, Tuscon, Ariz., 7–9, Nov. 1983, IEEE.

While Ben-Or's protocol tolerates $$\left\lceil \frac{n}{5} \right\rceil - 1$$

corrupted parties, whereby this is called $$\left\lceil \frac{n}{5} \right\rceil - 1$$

resilient, with exponential expected running time, Rabin tolerates $$\left\lceil \frac{n}{8} \right\rceil - 1$$

corrupted parties with constant expected running time, but requires one previously generated secret value per transaction. Therefore, this protocol needs a trusted dealer after a constant number of transactions that generates new secrets.

In 1984, G. Bracha introduced a protocol for asynchronous broadcast with the article "An asynchronous [(n−1)/3]-resilient consensus protocol", In Proceedings of the Third Annual ACM Symposium on Principles of Distributed Computing, pp. 154–162, Vancouver, Canada, 27–29, Aug. 1984. This protocol has become an important primitive for later protocols. However, it requires $3n^2$ messages for one single broadcast, therefore no protocol using this primitive reaches agreement with less than $O(n^3)$ messages. R. Canetti and T. Rabin developed the first protocol with a resilience of $$\left\lceil \frac{n}{3} \right\rceil - 1.$$

This has been published under the title "Fast Asynchronous Byzantine agreement with optimal resilience", In STOC93, pp. 42–51, 1993. Although the number of messages is polynomially bounded, this protocol is impractical, mainly due to the high cost for creating a common coin.

In view of common coins, it can be shown that a real random coin, i.e., without pre-distributed initial values, takes at least as many messages as the Byzantine Agreement itself. D. Beaver and N. So suggested in "Global, unpredictable bit generation without broadcast", in Tor Helleseth, editor, Advances in Cryptology-EUROCRYPT 93, v. 765 of Lecture Notes in Computer Science, pp. 4254–434, Springer Verlag 1994, 23–27, May 1993, a cryptographic coin-tossing scheme to generate a bounded number of distributed pseudo-random coins. Besides only generating a bounded number of coins before a trusted dealer is needed again, their protocol requires all parties to open their coins in order, i.e., a party can not open coin l+1 if it did not open coin l before, which might cause problems if a party temporarily crashes or performs several transactions simultaneously.

U.S. Pat. No. 4,569,015 describes a method for achieving a multiple processor agreement in a synchronized network optimized for no faults wherein an originating processor broadcasts a value in a message with its unforgeable signature to all n active processors, including itself. Receiving processors in the network pass such a message on with their own unforgeable signatures to all active processors, including themselves. If the number of signatures and phases is the same at each processor after the first two successive passings, then agreement as to the value with no fault is indicated, otherwise if after two passings, t+1 signatures have been collected, then these are signed and sent in the third passing, and in any case, each processor continues the steps of repeatedly sending messages when received, and appending its signature until t+2 passings have occurred. At that time, a processor will agree to the value if at least t+1 signatures append the message, otherwise a default value is adopted, t (n/2) being a reliability measure.

U.S. Pat. No. 5,598,529 discloses a computer system resilient to a wide class of failures within a synchronized network. It includes a consensus protocol, a broadcast protocol and a fault tolerant computer system created by using the two protocols together in combination. The protocols are subject to certain validity conditions. The system in the state of consensus is guaranteed to have all non-faulty processors in agreement as to what action the system should take. The system and protocols can tolerate up to 3t+1 total number of processor failures, but requires as well as the before mentioned method timing guarantees.

P. Bergman and J. A. Garay presented in their article "Randomized Distributed Agreement Revisited", 23rd Int. Conf. On Fault-Tolerant Computing (FTCS-23), pp. 412–419, 1993, a randomized distributed agreement protocol for asynchronous networks that works for n>5t processors, where n is the size of the network. This protocol belongs to the class of protocols that require a "trusted dealer" continuously.

It is an object of the present invention to create a consensus protocol for an asynchronous network capable of tolerating a maximum of t faulty devices, processors, or parties.

It is a further object of this invention to provide a method to be operable among n processors or parties, where at most t<n/3 processors/links are faulty, and further wherein agreement can be achieved in constant expected time with the number of messages being in the order of the square of n.

It is another object of this invention to provide a cryptographic coin-tossing protocol that allows to create an arbitrary number of distributed unpredictable coins.

SUMMARY OF THE INVENTION

The objects of the invention are achieved by the invention which devises a machine-implementable method for achieving Byzantine Agreement among n participating network devices, also called processors or parties, connected by an asynchronous, complete network. This method turns out to be practical and also theoretically nearly optimal in the sense that it withstands the maximum number of corrupted parties, runs in a constant expected number of rounds, uses a nearly optimal number of messages whereby the total bit-length of these messages is also nearly optimal.

In general, the objects are attained by (a) using unforgable signatures to authenticate the sender of each message; (b) further using these signatures to prove that the sender of a message followed the protocol; (c) using a threshold signature scheme to reduce message size; and (d) using a common coin that is unpredictable until some k, t<k<n processes involved are ready to reveal it, where t is the number of tolerable faulty devices or parties.

A suitable threshold signature scheme has been provided by V. Shoup and published in the article "Practical threshold signatures", in Technical Report RZ 3121, IBM Zurich Research Laboratory, April 1999. This article is incorporated herein by means of reference.

For achieving Byzantine Agreement, a method for generating an unpredictable bit in an asynchronous network, also referred to as distributed pseudo-random number-generator, is disclosed that bases on a linear secret-sharing scheme. By using a linear threshold signature in conjunction with the Diffi-Hellman problem, this method provides an efficient way to generate arbitrarily many unpredictable bits.

The method for generating an unpredictable bit shows the advantage that each participating network device is able to generate as many as desired unpredictable bits independently. This coin-tossing protocol is therefore practically neither limited to a number of coins nor depended on provided coins from a trusted party. Also, a random access to the coins is provided which shows the advantage that no order has to be followed. The use of a two threshold coin makes the protocol very efficient.

The method for achieving Byzantine Agreement, in the following simply called method, comprises four basic steps, being (i) a "pre-vote" which is used to amplify an existing majority for some value; (ii) a "main-vote" to determine a majority or identify a tie; (iii) a "termination detector" to detect when the majority for a certain value is sufficient to decode; and (iv) a common-coin subroutine to break ties and prevent an adversary from controlling the flow of the protocol. Deciding is atomic and final; a decision may neither be changed nor extended.

A significant part of the method is the proof of correctness included into every message to prevent corrupted parties from sending arbitrary values and the usage of a common coin primitive and threshold signatures.

The method results not only in the maximal number of tolerable traitors, t<n/3, but also in a linear expected number of messages per process and constant message size. As to other methods in the prior art, none could offer efficient Byzantine Agreement in a fully asynchronous system when the number of traitors is as high as $t<n/3$.

If the number of messages sent between n participating network devices or parties is quadratic, then the advantage occurs that the total number of messages to be sent can be estimated in advance.

When the expected running time is constant, then the advantage occurs that the load on the network is calculable and defined response times can be expected and used. It shows advantageous if a transaction identifier can be used, because then each participating network device can run several instances of the protocol simultaneously.

It is possible that a participating network device activates one instance of the protocol by receiving a message containing both the transaction-identifier and an initial agree-value.

It is an advantage if threshold signatures are applied, because the size of the used messages can be reduced.

When a two threshold coin is used, where t is the maximum number of traitors in the asynchronous network and k, with $n>k>t$, the number of participating network devices needed to obtain the two threshold coin, then the advantage occurs that the participating network devices or parties are allowed to broadcast their shares earlier or before others broadcast their shares without endangering security. Thus, the efficiency can be increased.

The binary value of the bit, e.g., $\{Y, N\}$ or $\{1, 0\}$, can be voted by at least one participating network device before this value itself is known the voters, i.e., if none or not all of the share-values have been received from the other participating network devices. This shows advantageous, because the participating network devices are allowed to broadcast their shares after a coin-vote, thereby increasing either security or efficiency.

It is possible, that $t+1$ participating network devices are used as asynchronous relay stations in order to keep the number of messages in the order of n t. That means in particular, if slow network devices are in the system then the load can be shifted to faster or unloaded ones.

When at least one participating network device jumps in a present round of vote even if this participating network device is in a round of vote smaller in number than the present round of vote, then the advantage occurs that the speed of the execution of the present method can be increased and some lost messages can be tolerated.

Glossary

The following are informal definitions to aid in the understanding of the description.

Group: A group in the cryptographic sense is an algebraic system $(G,*)$ consisting of a set of elements or numbers and a group operation $(*)$ with some specified properties, where $(*)$ is associative, has a neutral element, and where every element in G has an inverse element. The choice of the symbol $(*)$ is arbitrary. In fact, the operation of most groups is denoted by either $+$ or ●, and such groups are referred to as additive or multiplicative group, respectively.

For example, for any positive integer q, a set $Z_q$ consists of the integers $0, \ldots, q-1$, and it forms a group under the operation of addition modulo q. Moreover, the subset of $Z_q$ consisting of those integers relatively prime to a forms a group under multiplication modulo q, and is denoted $Z_q^*$. In particular, if p is prime, then $Z_q^*$ consists of $\{1, \ldots, p-1\}$, and is a group with p-1 elements.

Hash function: A hash function is a computationally efficient function mapping binary strings of arbitrary length to binary strings of some fixed length.

Hybrid Failures The method for achieving Byzantine Agreement can distinguish between several different ways in which a network device can fail. This could for example be Byzantine Failures BF: If a byzantine failure BF occurs, the adversary has taken full control over the corresponding machine. All secrets this machine has are handed over to the adversary, who now controls its entire behavior.

Crash Failures CF: A crash failure CF simply means that the corresponding machine stops working. This could happen anytime, i.e., even in the middle of a broadcast or while sending a message. It is assumed that there is no mechanism other parties can reliably detect such a crash.

Link Failures LF: A link failure LF occurs when not a party, but an interconnecting link becomes faulty. As the link has no access to authentication keys, it is easy to prevent it from modifying or inserting messages. A faulty link could however delete messages, and it might completely disconnect two parties.

Adversary structure An adversary structure T is a set of sets (coalitions) of parties whose corruption the system should be tolerated. Let M be the set of all participating network devices. An adversary structure is called $Q^2$, if no two coalitions $N_1, N_2 \epsilon T$ satisfy $N_1 \cup N_2 = M$.

$Q^3$, if no three coalitions $N_1, N_2, N_3 \epsilon T$ satisfy $N_1 \cup N_2 \cup N_3 = M$.

$Q^{2+3}$ with respect to CF and BF, if for all $c_1, c_2 \epsilon CF$ and all $b_1, b_2, b_3 \epsilon BF$, $M \backslash \{b_1 \cup b_2 \cup b_3 \cup c_1 \cup c_2\} \supset \emptyset$;

A $Q^2$ adversary structure is sufficient to solve byzantine agreement if only crash failures CF occur. $Q^3$ is applied in the byzantine case, where only byzantine failures IBF occur, while $Q^{2+3}$ is the generalization for the hybrid crash-byzantine failure case.

Threshold signature A k out of l threshold signature scheme is a protocol that allows any subset of k players or parties out of l to generate a signature, but that disallows the creation of a valid signature if fewer than k players participate the protocol. This non-forgeability property should hold even if some subset of less than k players are corrupted and work together. Furthermore, the threshold signature scheme should also be robust, meaning that corrupted players should not be able to prevent uncorrupted players from generating signatures. The threshold signature can be applied to the adversary structure model, whereby k and l are replaced by appropriate sets.

BRIEF DESCRIPTION OF THE DRAWINGS

The invention is described in detail below with reference to the following schematic drawings.

DETAILED DESCRIPTION OF THE INVENTION

The present method for achieving Byzantine Agreement uses unforgable, transferable signatures to allow parties or participating network devices to justify their messages, which limits the possibilities of an adversary. Furthermore, a strong common coin is applied, i.e., every party is guaranteed to get the same result out of a common-coin subprotocol with all but negligible probability. Furthermore, by using suitable threshold signatures, the message size stays independent of the number of parties involved. If a reliable broadcast is applied, then signatures can be omitted at the cost of more communication.

The method for achieving Byzantine Agreement comprises a vote part which can be divided into a pre-vote part and a main-vote part, a decision part and a part where a cryptographic coin, herein referred to as coin, is cast.

Figure 1:
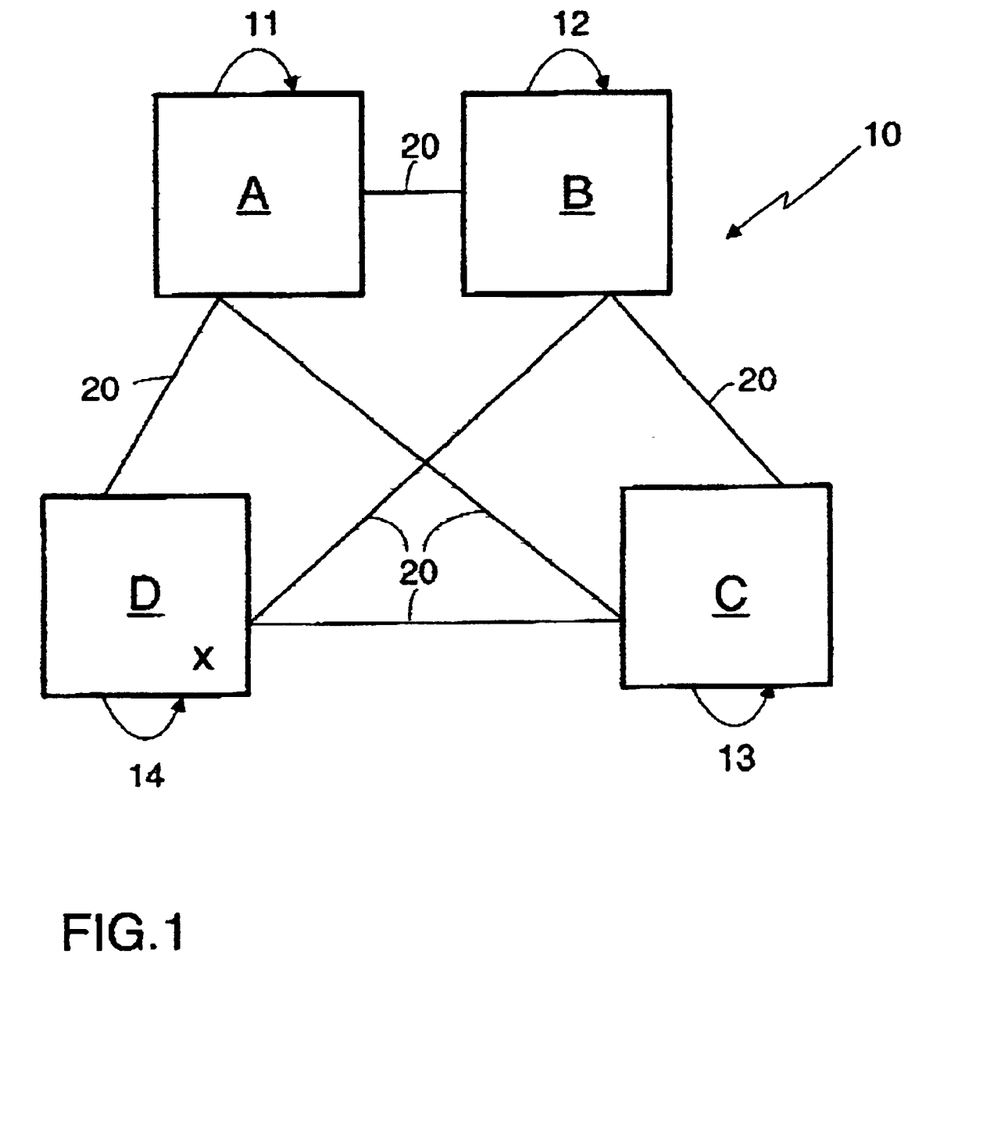
FIG. 1 shows a typical asynchronous network with multiple participating network devices.

FIG. 1 shows an example of a common computer system 10 consisting of four participating network devices A, B, C, D, which are connected via communication lines (11 through 14 and 20) to a network. The system, where the Byzantine Agreement can be achieved, has one faulty device, which is designated by the "X" in participating network device D. Each participating network device A, B, C, D may be any type of computer device known in the art from a computer on a chip or a wearable computer to a large computer system. The communication lines can be any communication means commonly known to transmit data or messages from one participating network device A, B, C, D to another. For instance, the communication lines may be either single, bi-directional communication lines 20 between each pair of participating network devices A, B, C, D or one unidirectional line in each direction 20 between each pair of participating network devices A, B, C, D. These computer systems 10 and communication lines 20 are well known in the art. In the case where a participating network device A, B, C, D sends information to itself, an equivalent result could be achieved by merely moving data within the participating network device and not sending it over a communication line to itself. The common computer system 10 is shown to facilitate the description of the following Byzantine Agreement protocol.

For the voting part, two votes per round are used, the pre-vote and the main-vote. Each vote $V_{i,r}$ (vote of participating network device i in round r) is a tuple comprising a transaction-identifier TID in case several instances of the protocol run in parallel, a tag marking it as a pre- or main-vote, a value $\epsilon\{1, 0, \text{abstain}\}$ or $\{Y, N, \text{abstain}\}$, a round number, a first signature $s_1$ on the last three items, and a second signature $s_2$ for justification comprising enough signatures to show the receiver that this vote was executed according to the protocol. "Y" stays for yes and "N" for no.

An abstaining main-vote implies that the corresponding party or network device A, B, C, D is undecided and abstains from the present vote. One could think of the main-vote as a filter that ensures that it is not possible to generate justified pre-votes for both Y and N in the next rounds pre-vote; the pre-vote could be seen as an amplifier that makes as many people vote for Y or N (as opposed to abstaining votes) as possible.

The following steps indicate the general method for achieving Byzantine Agreement, whereby a series of messages being sent and received by each participating network device A, B, C, D.

Step 1: The value of a coin resulting from the transaction identifier TID and round r is revealed, which may be used in the following steps 2 to 4. The first round is special as the votes are not determined by the last round but by a private input value.

Step 2: Each participating network device A, B, C, D casts a pre-vote for a provided agree-value $\epsilon\{1, 0\}$ or Y for yes, or N for no. These pre-votes are justified by an appropriate threshold signature, also referred to as second signature $s_2$, and accompanied by an valid signature share, also referred to as first signature $s_1$, on a pre-vote message pvm.

Step 3: After collecting n–t valid pre-votes, each participating network device A, B, C, D casts a main-vote for a main-vote value mv $\epsilon\{Y, N, \text{abstain}\}$. As with pre-votes, these main-votes are justified by an appropriate threshold signature, and accompanied by a valid signature share on a main-vote message mvm.

Step 4: After collecting n–t valid main-votes, each participating network device A, B, C, D examines these votes. If all votes are for an agree-value $\epsilon\{Y, N\}$, then each participating network device A, B, C, D decides the agree-value for the respective transaction-identifier TID, but continues to participate in the protocol for one more round. Otherwise, the participating network device A, B, C, D simple proceeds to the next round.

The pre-vote and main-vote in round r can be justified by some proof. In general, a message from one participating network device, e.g., participating network device A to another participating network device, e.g., participating network device B, has the form TID, A, B, payload so that in specifying a message, in the following only the payload is specified; the values of transaction-identifier TID, A, and B are implied from the context. Thereby A indicates the sender and B the receiver of the message sent in the network, as depicted in FIG. 1.

Figure 2:
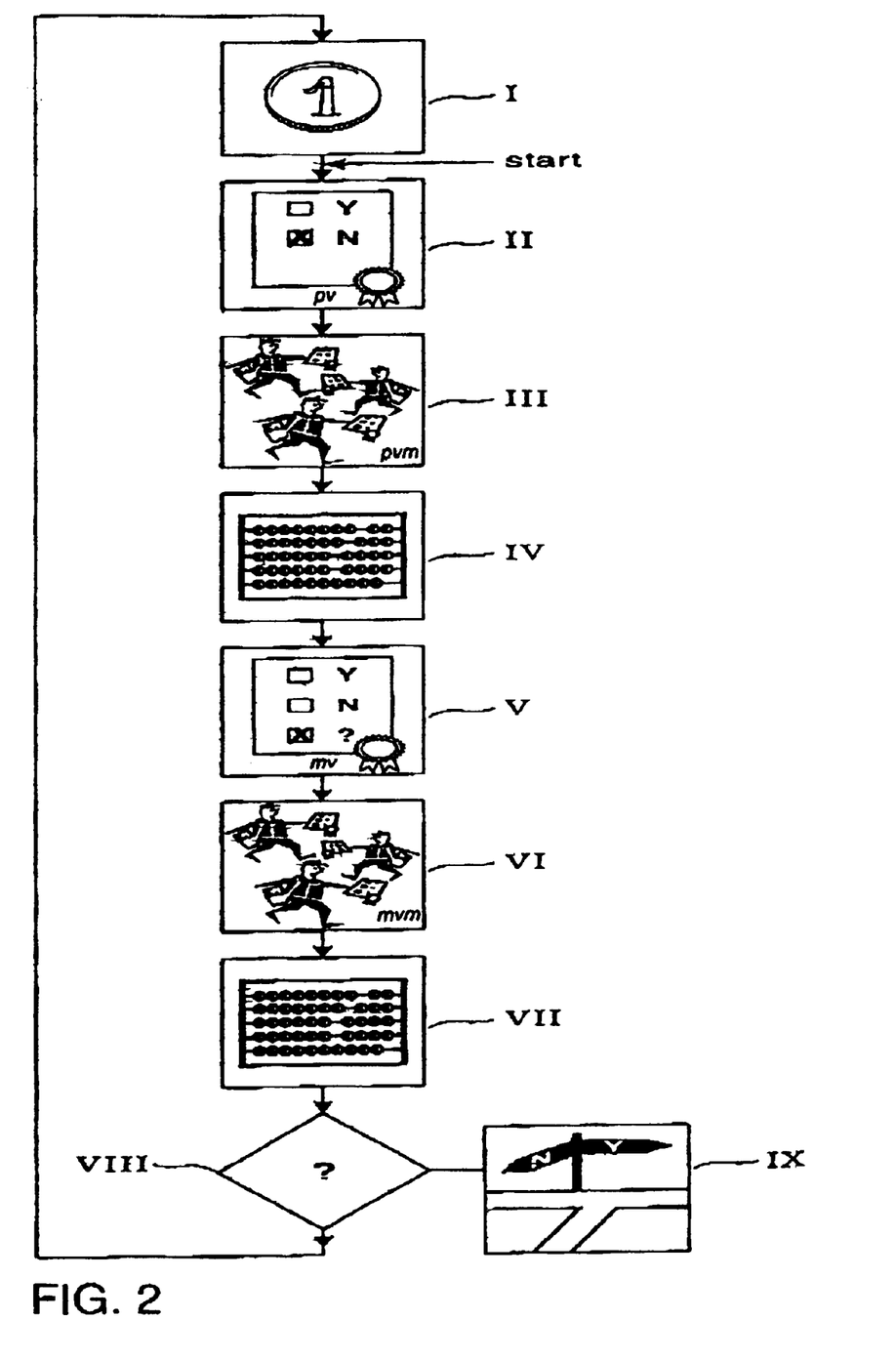
FIG. 2 shows a schematic diagram of the Byzantine Agreement protocol according to the present invention.

The following describes details for round $r \geq 1$. FIG. 2 shows the flow of the Byzantine Agreement protocol for an implementation.

Step 1: As indicated in box I, each participating network device A, B, C, D generates its share of the coin resulting out of the transaction-identifier TID and round r, and sends to all other participating network devices A, B, C, D a message of the form coin, r, coin-share.

Since the first round is special, the beginning for the Byzantine Agreement protocol is indicated with "start" below box I for the below mentioned reasons.

Step 2: Each participating network device A, B, C, D collects n–t shares of the coin (TID, r) and combines these shares to get a value F(TID, r) $\epsilon\{Y, N\}$. After this, each participating network device A, B, C, D casts a pre-vote, as indicated in box II, for a first pre-vote value $pv_Y$ or a second pre-vote value $pv_N$, Each pre-vote is accompanied by a justification and sent to every participating network device A, B, C, D as pre-vote message pvm, which is depicted in box III.

In general, such a pre-vote message pvm comprises a pre-vote variable pv with either the first pre-vote value $pv_Y$ or the second pre-vote value $pv_N$, and comprises further the first signature $s_1$ proving the pre-vote variable and the second signature $s_2$ justifying the pre-vote variable.

In round r=1, the participating network device's A, B, C, D pre-vote value pv $\epsilon\{Y, N\}$ is equal to the initial or private value, and no justification is required, i.e., the justification is simply a null string.

In rounds r>1, a pre-vote for the pre-vote value pv is justified either with a threshold signature on the message pre-vote, TID, r–1, pv or, if the pre-vote value pv=F(TID, r), with a threshold signature on the message     main-vote, TID, r−1, abstain.

In the first case, it is said that the pre-vote is a "hard" pre-vote for the pre-vote value pv, and in the second, a "soft" pre-vote for the pre-vote value pv. The threshold signatures are obtained from the computations in previous rounds. It is assumed that the justification indicates whether the pre-vote is "hard" or "soft".

Upon casting a pre-vote for the pre-vote value pv, each participating network device A, B, C, D generates its share of a threshold signature on the message     pre-vote, TID, r, pv and sends to every participating network device A, B, C, D one pre-vote message pvm, indicated by box III and mentioned above, of the form     pre-vote, r, pv, first signature $s_1$, second signature $s_2$.

Step 3: After casting its pre-vote, each participating network device A, B, C, D waits, as indicated in box IV, for n−t properly justified or valid round r pre-vote messages pvm, each of which is accompanied by a corresponding valid signature share, and then casts a main-vote for round r, which it does as follows.

From the main-vote, as indicated in box V, results a main-vote value mv∈{Y, N, abstain}. Like pre-votes, each main-vote is also justified. A main-vote message mvm is sent to every participating network device A, B, C, D. This main-vote message mvm includes a main-vote variable mv comprising either a first main-vote value $mv_Y$, a second main-vote value $mv_N$, or a third main-vote value $mv_E$.

If among the n−t valid pre-votes or pre-vote messages $pvm_A$, $pvm_B$, $pvm_C$, $pvm_D$ collected by each participating network device A, B, C, D there is a pre-vote for 'Y' and a pre-vote for 'N', then the participating network device's A, B, C, D main-vote for round r is abstain, that means the third main-vote value $mv_E$ is chosen. The justification for this main-vote comprises the justifications for the two conflicting pre-votes. Note that as pre-votes in round r=1 are unjustified, so are main-votes for abstain.

Otherwise, each participating network device A, B, C, D has collected n−t justified and thus valid pre-votes or pre-vote messages $pvm_A$, $pvm_B$, $pvm_C$, $pvm_D$ for some agree-value ∈{Y, N}, and since each of these comes with a valid signature share on the pre-vote message $pvm_A$, $pvm_B$, $pvm_C$, $pvm_D$     pre-vote, TID, r, pv each participating network device A, B, C, D can combine these shares from n−t participating network devices A, B, C, D to obtain a valid threshold signature on this message. In other words, the first signatures $s_1$ are shares for the second signatures $s_2$.

If all n−t pre-vote variables have the first pre-vote value $pv_Y$ then the first main-vote value $mv_Y$ is obtained. In the case that all n−t pre-vote variables have the second pre-vote value $pv_N$ then the second main-vote value $mv_N$ is obtained.

Upon casting its main-vote with the main-vote value mv ∈{Y, N, abstain}, each participating network device A, B, C, D generates its share of a threshold signature on the message     main-vote, TID, r, mv and sends to all other participating network devices A, B, C, D the main-vote message mvm, as indicated in box VI, of the form     main-vote, r, mv, first signature $s_1$, second signature $s_2$.

Step 4: After casting its main-vote, each participating network device A, B, C, D waits, as indicated in box VII, for n−t justified round r main-votes or main-vote messages $mvm_A$, $mvm_B$, $mvm_C$, $mvm_D$, each accompanied by a corresponding valid first signature $s_1$ and the second signature $s_2$.

In the following, each participating network device A, B, C, D can perform a decision as it is indicated by box VIII. Otherwise the protocol starts with Step 1, the generation of the coin.

If these n−t main-votes are all main-votes for the main-vote value mv ∈{Y, N}, then the participating network device A, B, C, D decides the main-vote value mv for the corresponding transaction-identifier TID, but continues to participate in the protocol for one more round. Otherwise, the participating network device A, B, C, D simply proceeds to the next round.

In the case that all n−t main-vote values mv have the first main-vote value $mv_Y$ it is decided for the first agree-value Y and in the case that all n−t main-vote values mv have the second main-vote value $mv_N$ it is decided for the second agree-value N, as indicated in box IX.

In either case, when proceeding to the next round, the pre-vote in round r+1 is determined as follows. If the participating network device A, B, C, D has collected n−t main-votes for 'abstain', it can combine signature shares to obtain a threshold signature on the message     main-vote, TID, r, abstain, which allows the participating network device A, B, C, D to make a soft pre-vote in round r+1. Otherwise, one of the main-votes was for a main-vote value mv ∈{Y, N}, and was accompanied by threshold signature on     pre-vote, TID, r, mv, and this will allow the participating network device A, B, C, D to perform a hard pre-vote for main-vote value mv in round r+1.

The method for achieving Byzantine Agreement depends on a reliable common coin primitive. The protocol builds on a distributed pseudo-random function: It is supposed to create a pseudo-random bit-string of length w, i.e., a distributed pseudo-random function F: $\{0, 1\}^* \to \{0, 1\}^w$ is provided to create a coin for the Byzantine Agreement, set w=1. A cryptographic group G of prime order q is defined. The following three hash functions are used     H: $\{0, 1\}^* \to G$     h: $G \to \{0, 1\}^w$     H': $G \times G \times G \times G \to Z_q$ At the initialization, a value $x \in Z_q$ is shared among the participating network devices A, B, C, D such that each participating network device A, B, C, D gets share $x_{A,B,C,D}$ $\in Z_q$ and k shares can reconstruct x. This is done using a linear secret-sharing scheme.

The basic idea is that because of the linearity of the secret sharing, not only k shares $x_{A,B,C,D}$ can reconstruct x, but also k shares $g^{x_{A,B,C,D}}$ can reconstruct $g^x$ for any generator of G. Using the hash functions H and h it is possible to generate a random g from some commonly known input $r \in \{0,1\}^*$ or create a w-bit string from $g^x$, respectively.

Figure 3:
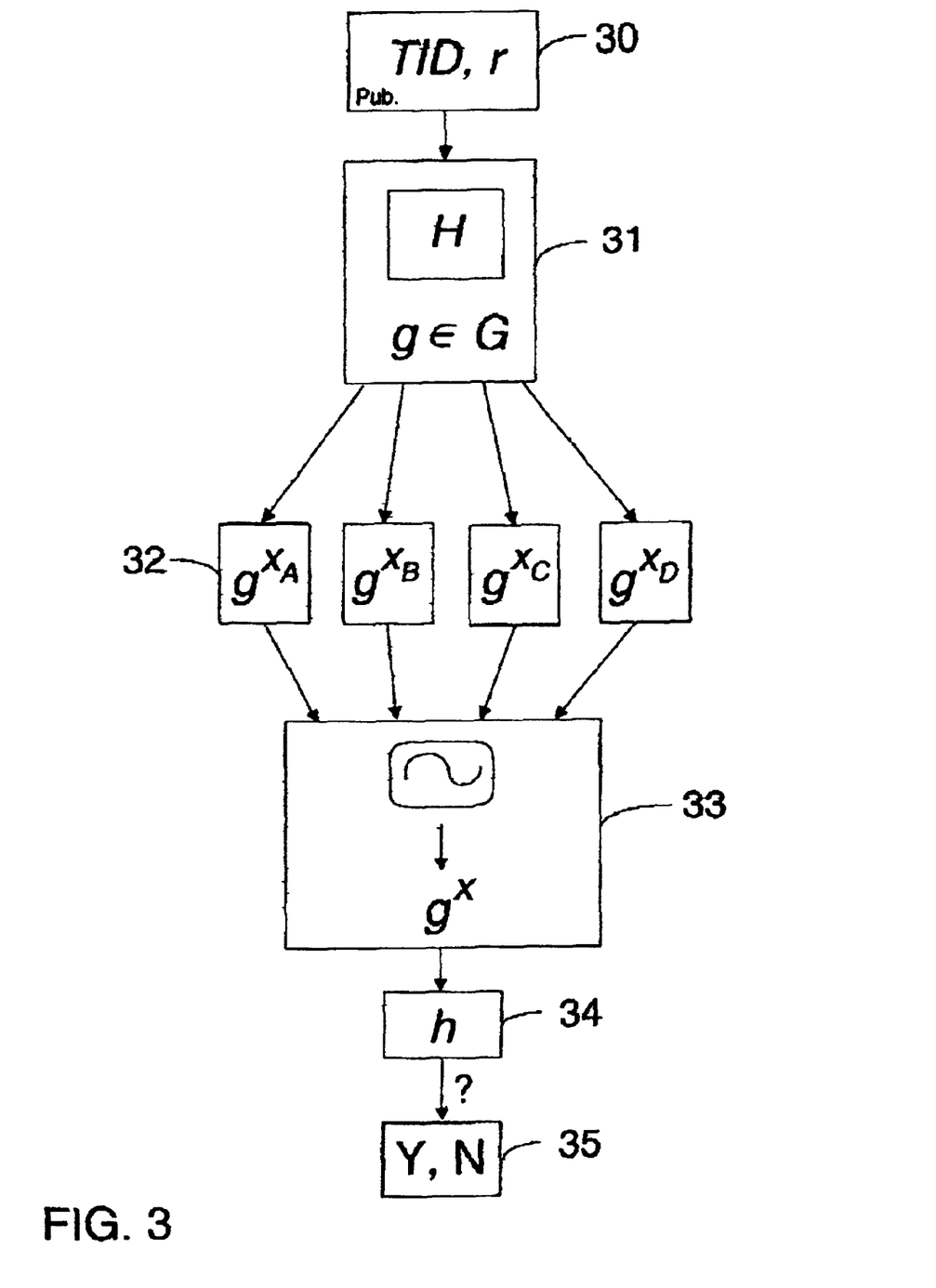
FIG. 3 shows a schematic diagram for generating an unpredictable bit.

FIG. 3 shows a schematic diagram for generating an unpredictable bit. Each participating network device A, B, C, D has its local secret, also referred to as secret-value $x_A$, $x_B$, $x_C$, $x_D$. As mentioned above, the value $x \in Z_q$ is a global secret and thus shared among the participating network devices A, B, C, D. Box 30 depicts the transaction-identifier TID and the round r, which are public. Both transaction-identifier TID and the round r are used in conjunction with the hash functions H to generate a common number $g \in G$, as indicated with box 31. Each participating network device A, B, C, D derives a share-value $g^{x_{A,B,C,D}}$ by raising the chosen common number g to the power of the secret-value $x_{A,B,C,D}$, respectively, as indicated in box 32. The share-value $x_A$, for example, is then sent to other participating network devices B, C, D. Further in the example, the participating network device A receives the share-values $g^{x_B}$, $g^{x_C}$, $g^{x_D}$ from the other participating network devices B, C, D and is therewith able to assemble from at least two of the share-values $g^{x_A}$, $g^{x_B}$, $g^{x_C}$, $g^{x_D}$ a common value by combining and interpolating in the exponent of the common number g, as indicated in box 33. After the common value is transformed, e.g., by the hash function h indicated in box 34, a binary value of the common value can be uncovered as indicated in box 35. Thereby, the value of the bit can be a single digit of the common value or derived from several digits or any other suitable method to uncover the binary value.

A distributed pseudo-random number generator has to offer four functions, an initialization function "Init-Shares", and for each transaction the functions "generate", "verify" and "combine". An implementation can be as follows:

Init-Shares( )

Share a value $x \in Z_q$ using a linear secret sharing scheme, such that k>t shares are needed to compute x. Send share $x_A$ to participating network device B.

Choose a cyclic group G of prime order q and a random verification value $g_v \in G$. Send all $g_v^{x_A}$ to all participating network devices A, B, C, D.

Generate-Share(r)

$g_r \leftarrow H(r)$

Select random s $c \leftarrow H'(g_v^{x_A}, g_r^{x_A}, g_v^s, g_r^s)$ $z \leftarrow s + x_A c$ $ver_i \leftarrow (g_v^s, g_r^s, C, Z)$ $\sigma_{A,r} \leftarrow (g_r^{x_A}, ver_i)$ Verify-Share($\sigma_{B,r}$)

Share $\sigma_{j,r} = (g_r^{x_B}, g_v^{s_B}, g_r^{s_B}, C_B, z_B)$ is valid if $g_r^{z_B} = g_r^{s_B}(g_r^{x_B})^{C_B}$ and $g_v^{s_B} = g_v^{s_B}(g_v^{x_B})^{C_B}$ The technique of Verify-Share has been described by D. Chaum and T. Pederson in "Wallet databases with observers", in Advances in Cryptology, Crypto 92, pages 89–105, 1992.

Combine-Shares($\sigma_{1,r}, \ldots, \sigma_{n-t,r}$)

Combining the shares in the exponent, reconstruct $g_r^x$, where Output $h(g_r^x)$.

Several optimizations to the basic protocol are possible to improve its performance. In the following, the participating network device is referred to as party.

Abstract Coin Votes

This optimization allows processes to vote for the value of the coin before they know it by replacing the vote for Y or N by a vote for "coin". The receiver is then able to evaluate the vote as soon as the corresponding coin is opened. This allows to piggyback the coin onto the pre-vote, saving one message per round. If threshold signatures are used, the way of signing messages has to be changed. Instead of signing a message "Party A votes Y" two messages "Party A votes Y if the coin is N" and "Party A votes Y if the coin is Y" are signed. Correspondingly, if a party wants to vote "coin", it signs two messages "Party A votes N if the coin is N" and "Party A votes Y if the coin is Y". This way, it is guaranteed that the threshold signatures can still be applied.

Signature Free Agreement

If processing time is expensive compared to network delay, one can use communication instead of computation. If a reliable broadcast is used as described, for example, by G. Bracha, no signatures are needed, at the drawback of more communication in the verification, a party accepts a vote as soon as it gets all messages this vote resulted of.

Real Termination

There are parties which do not terminate the protocol. It is possible that some parties decide in round R, going through the voting part one more time to help the other parties decide. The other parties that decide in round R+1, however, also try to vote one more round. But waiting for these votes may never terminate as more than t parties may already have quit the protocol. Though it is not a major problem, all the afflicted parties have to keep some process running in the background which keeps on waiting for more votes that will never arrive. This is still inconvenient. One solution to this is that if one party decides, it does rot participate in further rounds of the protocol. Instead, it sends a message to all other parties containing its agree-value $\in \{Y, N\}$ and n-t signatures on main-votes that led to this decision. All parties that receive this message immediately stop the protocol and echo this message to all other parties. This allows the one party to completely terminate the protocol after broadcasting this decision message. As this model assumes eventual message delivery, which is not present in a real-world scenario where messages can be lost, some lower-lever protocol would still have to be able to resend the message, but this is unavoidable and requires far less effort than keeping the entire protocol running.

Reduced Waiting

A real bottleneck of the protocol in a slow network is when a party waits until receiving n-t votes by other parties. It is, however, not always necessary to wait for all the messages. After receiving two pre-votes for different values, the main-vote is determined by this two votes. In a similar way, after one main-vote that does not abstain has been received, the pre-vote is determined and the other main-votes are not relevant anymore (although they should be counted and evaluated if the decision-condition is fulfilled).

Finally, a party might have some information about what signatures the recipient of a message knows and does not need to include them into the proof For example, to prove an abstaining main-vote, a proof for a pre-vote on N and a pre-vote on Y has to be added. As every party did a pre-vote, one of these proofs is not necessary. Furthermore, a party can refuse giving out a main-vote to another party before receiving its pre-vote for this round. This decreases both number and size of the messages. On the other hand, a party spends more time waiting, which will slow down the overall protocol.

Strip Redundancy

As every party receives its own votes, any uncorrupted party that makes a main-vote will also send a pre-vote. Thus, this pre-vote is not necessary and can be left out. Also, if a party receives several votes on the same value, it is not necessary to check the validity of all votes. If one party can prove that the agree-value is a valid vote in some round r, then it is possible for all other parties to get all information needed for this proof, so there is no need to verify the other votes. Furthermore, if at least t+1 parties voted $v_j$, at least one of them was uncorrupted, so it is not necessary to verify any vote at all.

Parallelism

There is no problem running several rounds in parallel. If, for example, a party receives all information needed in round 5 before having finished round 4, it can well perform the round 5 operations before the round 4 ones.

Routers

Figure 4A:
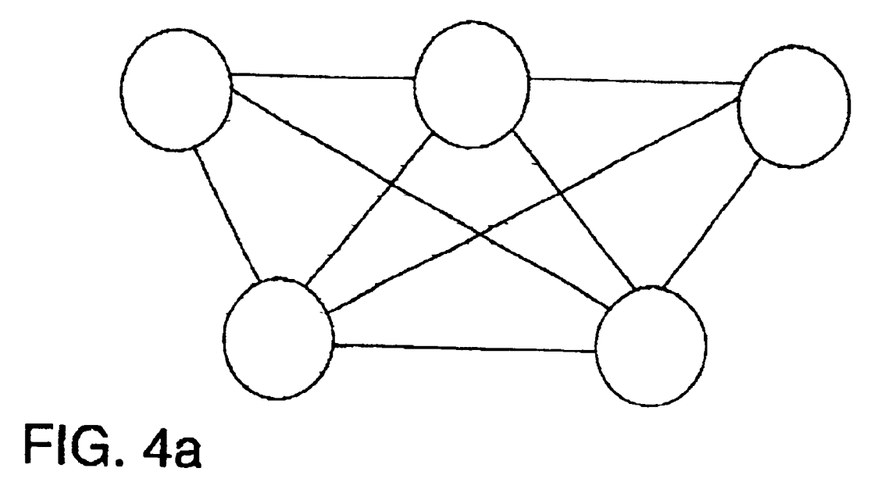
FIG. 4a shows a schematic illustration of a fully connected asynchronous network.
Figure 4B:
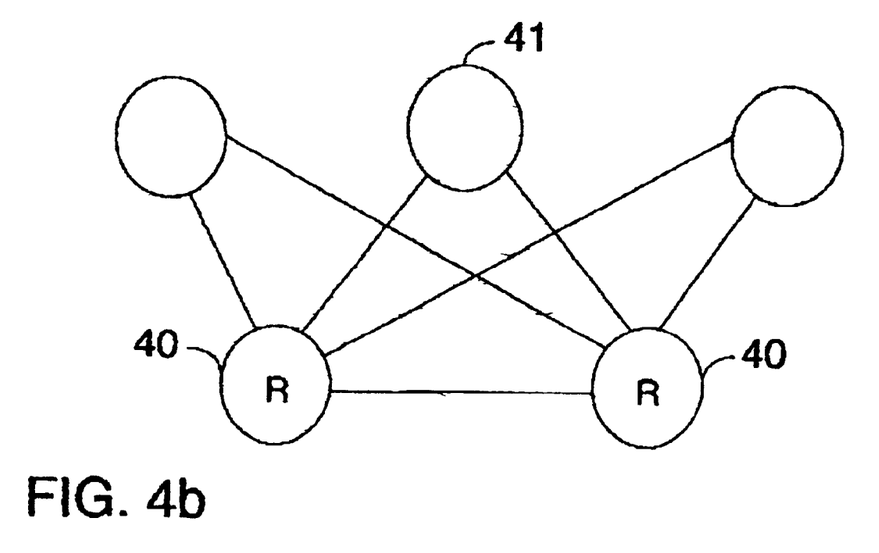
FIG. 4b shows a schematic illustration of connected asynchronous network having two relays.

FIG. 4a shows a schematic illustration of a fully connected asynchronous network without routers. Each circle indicates a party or a participating network device, whereby each party communicates with all the other parties. A distinct subset R of t+1 processes is defined and called "relays". FIG. 4b shows a schematic illustration of a connected network having two relays or relay-stations 40. If a first-party 41 wants to broadcast a message m to all parties, the first-party 41 sends m only to the relay-stations 40. All these relay-stations 40 then wait until they collected n−t valid messages for this transaction-identifier TID and round r. They then evaluate the messages and send the verifiable result to all parties that are not relay-stations 40. The number of messages needed for n broadcasts is (n−1)(t+1) for sending the messages to the relays (n−1 because a relay does not send a message to itself) and (t+1) (n−(t+1)) for the relays to send the messages to all other parties.

Hybrid Adversary Structures

Instead of a fixed threshold of t out of n corruptions, it is possible to gain more flexibility by reflecting real world structures. For example, an adversary could be able to control all participating network devices with a certain operating system, or he might bribe one system administrator to get access to all participating network devices at a specific site. Adversary structures cope with such an attack scheme.

To define an adversary structure T, one has to define every coalition of parties whose corruption the system should tolerate, e.g., a coalition of all participating network devices with the same operating system. The set of all those sets then is the adversary structure T.

Figure 5:
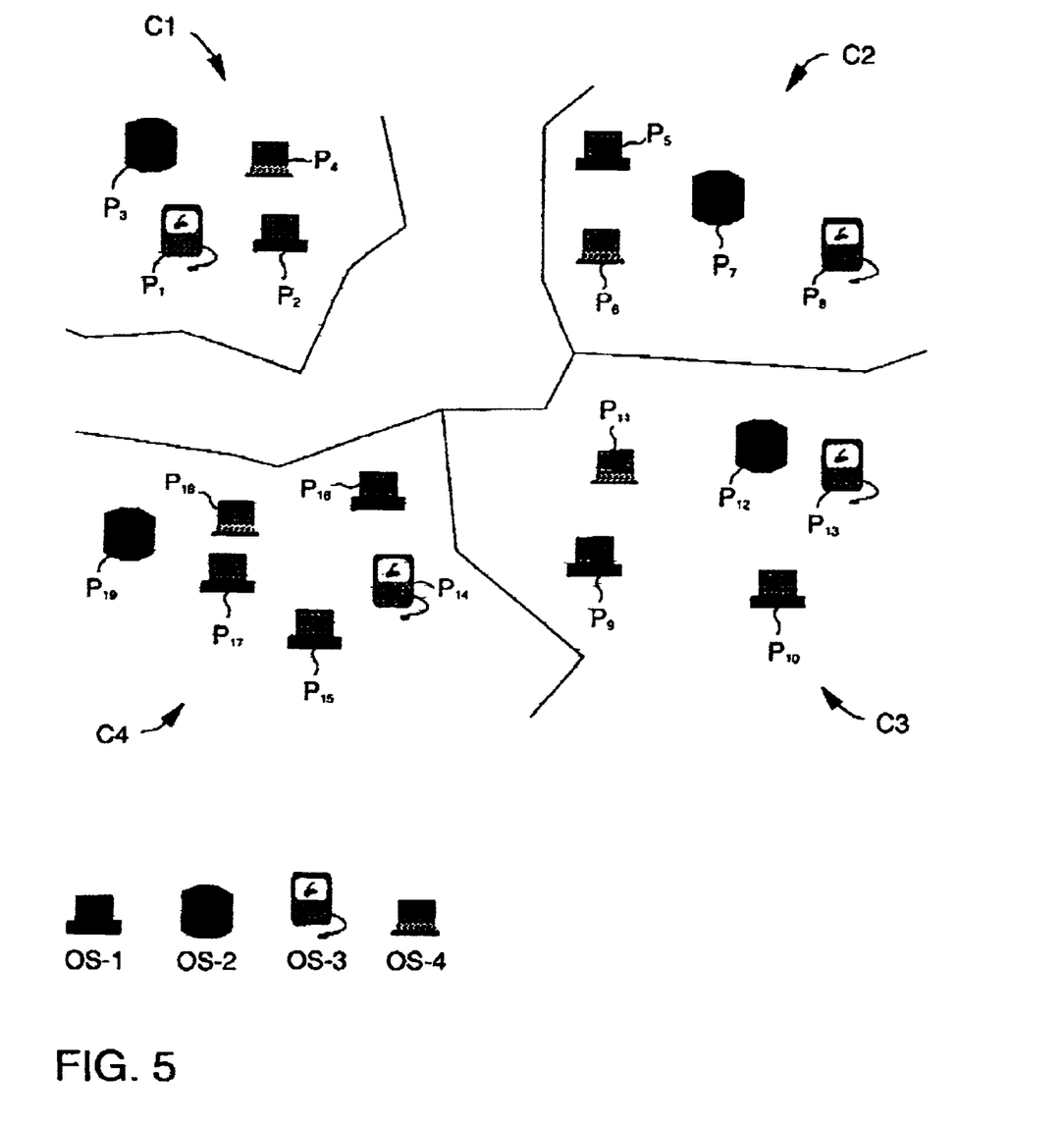
FIG. 5 shows a scenario of participating network devices distributed in a structured way.

FIG. 5 illustrates a scenario of 19 sites of participating network devices $P_1$ to $P_{19}$ distributed in a structured way, i.e. each participating network device $P_1$ to $P_{19}$ has an operating system OS-1 to OS-4 and a location within a county C1 to C4. By conventional t—out of n structures, any set of six (Byzantine) failing participating network devices can be tolerated. Using the corresponding adversary structures, one can tolerate simultaneous failures of one operating system and one location. In the present example, this can be up to 10 participating network devices (e.g., failure of all participating network devices in the fourth country C4 or with the first operating system OS-1), or less than four if the corruptions are well distributed, i.e., four participating network devices covering all countries and all operating systems.

In the method of achieving Byzantine Agreement, several types of failures can occur simultaneously. For example, it could differ between crash failures CF, byzantine failures BF, and link failures LF. This allows for a higher number overall number of failures to be tolerated.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for achieving agreement among n participating network devices to a first agree-value (Y) or a second agree-value (N) in an asynchronous network, the agreement arising out of a series of messages being sent and received by each participating network device, whereby the number t of faulty devices is less than n/3, each participating network device performing the following steps:

i) broadcasting to the participating network devices a pre-vote message comprising a pre-vote variable with a first pre-vote value or a second pre-vote value, and comprising a first signature proving the pre-vote and a second signature justifying the pre-vote variable;

ii) once having received n−t valid of the pre-vote messages with pre-vote variables from the participating network devices, performing a main-vote to obtain a main-vote variable with either a first main-vote value, a second main-vote value, or a third main-vote value, whereby
   if all n−t pre-vote variables have the first pre-vote value then the first main-vote value is obtained, or
   if all n−t pre-vote variables have the second pre-vote value then the second main-vote value is obtained, or
   if the n−t pre-vote variables are different then the third main-vote value is obtained;

iii) broadcasting to the participating network devices a main-vote message comprising the obtained main-vote variable, the first signature and the second signature; and iv) once having received n−t valid of the main-vote messages, performing a decision,
   if all n−t main-vote variables have the first main-vote value then deciding for the first agree-value or
   if all n−t main-vote variables have the second main-vote value then deciding for the second agree-value, thereby having achieved the agreement, and helping the other participating network devices to decide; otherwise i) broadcasting to the participating network devices a share-value($g^{x_{A,B,C,D}}$) to generate an unpredictable bit $\in \{Y, N\}$;

ii) receiving at least k share-values ($g^{x_A}, g^{x_B}, g^{x_C}, g^{x_D}$) from the participating network devices, where k is a number larger than t, assembling out of those a common value and deriving one bit thereof; and iii) repeating the steps starting from a), whereby
if all n−t main-vote variables have the third main-vote value then the binary value is used as the pre-vote variable, or
if at least one of all n−t main-vote variables has the first main-vote value then the first pre-vote value is used as the pre-vote variable, or
if at least one of all n−t main-vote variables has the second main-vote value then the second pre-vote value is used as the pre-vote variable.

2. Method according to claim 1, whereby a transaction identifier TID is used.

3. Method according to claim 1, whereby threshold signatures are applied.

4. Method according to claim 1, whereby a two threshold coin is used, where t is the maximum number of traitors in the asynchronous network and k, with n>k>t, the number of participating network devices needed to obtain the two threshold coin.

5. Method according to claim 1, whereby the number t of faulty devices is larger than n/3 if all or a part of the faulty devices fail by crashing.

6. Method according to claim 1, whereby t+1 participating network devices are used as asynchronous relay stations.

7. Method according to claim 1, whereby the binary value of the bit is voted by at least one first participating network device if none or not all of the share-values ($g^{x_B}$, $g^{x_C}$, $g^{x_D}$) have been received from the other participating network devices.

8. Method according to claim 1, whereby at least one first participating network device jumps in a present round of vote even if this participating network device is in a round of vote smaller in number than the present round of vote.

9. Method according to claim 1, whereby at least one of the first signature and the second signature is replaced by a broadcast primitive which guarantees that all the participating network devices receive a sent message or none of them.

10. Method according to claim 1, whereby several rounds are performed in parallel.

11. Method according to claim 1, whereby the number t of faulty devices is extended to a set T of sets comprising participating network devices.

12. Method according to claim 11, whereby the participating network devises show hybrid failures reflecting a different structure of the set T or different thresholds $t_i$, with i=1, 2, . . . l.

13. A method for achieving agreement among n participating network devices to a first or second agree-value in an asynchronous network, the agreement arising out of a series of messages being sent and received with a signature by each participating network device, whereby the number t of faulty devices is less than n/3, each participating network device performing the following steps:
a) broadcasting to all participating network devices a pre-vote value;
b) performing a main-vote to amplify majorities if n−t pre-vote values are validly received, and broadcasting to all participating network devices a main-vote value;
c) deciding for the first or second agree-value based on the received main-vote values, and broadcasting to all participating network devices a share-value to open a cryptographic common coin; and
d) receiving k share-values and, where k>t, assembling out of those a common value, uncovering a bit out of the common value, comparing the bit to the pre-vote value and repeating the steps starting from i) using the bit as the pre-vote value if the pre-vote values were different.

14. Method according to claim 13, whereby a transaction identifier TID is used.

15. Method according to claim 13, whereby threshold signatures are applied.

16. Method according to claim 13, whereby a two threshold coin is used, where t is the maximum number of traitors in the asynchronous network and k, with n>k>t, the number of participating network devices needed to obtain the two threshold coin.

17. Method according to claim 13, whereby the number t of faulty devices is larger than n/3 if all or a part of the faulty devices fail by crashing.

18. Method according to claim 13, whereby t+1 participating network devices are used as asynchronous relay stations.

19. A computer program product comprising program code means for performing the method for achieving agreement among n participating network devices to a first agree-value (Y) or a second agree-value (N) in an asynchronous network, the agreement arising out of a series of messages being sent and received by each participating network device, whereby the number t of faulty devices is less than n/3, each participating network device, said method comprising the steps of:
(a) broadcasting to the participating network devices a pre-vote message comprising a pre-vote variable with a first pre-vote value or a second pre-vote value, and comprising a first signature proving the pre-vote and a second signature justifying the pre-vote variable;
(b) once having received n−t valid of the pre-vote messages with pre-vote variables from the participating network devices, performing a main-vote to obtain a main-vote variable with either a first main-vote value, a second main-vote value, or a third main-vote value, whereby
if all n−t pre-vote variables have the first pre-vote value then the first main-vote value is obtained, or
if all n−t pre-vote variables have the second pre-vote value then the second main-vote value is obtained, or
if the n−t pre-vote variables are different then the third main-vote value is obtained;
(e) broadcasting to the participating network devices a main-vote message comprising the obtained main-vote variable, the first signature and the second signature; and
(d) once having received n−t valid of the main-vote messages, performing a decision,
if all n−t main-vote variables have the first main-vote value then deciding for the first agree-value or
if all n−t main-vote variables have the second main-vote value then deciding for the second agree-value, thereby having achieved the agreement, and helping the other participating network devices to decide; otherwise
(c) broadcasting to the participating network devices a share-value($g^{x_{A,B,C,D}}$) to generate an unpredictable bit ∈{Y, N};
(f) receiving at least k share-values ($g^{x_A}$, $g^{x_B}$, $g^{x_C}$, $g^{x_D}$) from the participating network devices, where k is a number larger than t, assembling out of those a common value and deriving one bit thereof; and
(g) repeating the steps starting from a), whereby
if all n−t main-vote variables have the third main-vote value then the binary value is used as the pre-vote variable, or
if at least one of all n−t main-vote variables has the first main-vote value then the first pre-vote value is used as the pre-vote variable, or if at least one of all n−t main-vote variables has the second main-vote value then the second pre-vote value is used as the pre-vote variable.

20. A computer program product comprising program code means stored on a computer-readable medium for performing the method for achieving agreement among n participating network devices to a first or second agree-value in an asynchronous network, the agreement arising out of a series of messages being sent and received with a signature by each participating network device, whereby the number t of faulty devices is less than n/3, each participating network device, said method comprising the steps of:
 a) broadcasting to all participating network devices a pre-vote value;
 b) performing a main-vote to amplify majorities if n−t pre-vote values are validly received, and broadcasting to all participating network devices a main-vote value;
 c) deciding for the first or second agree-value based on the received main-vote values, and broadcasting to all participating network devices a share-value to open a cryptographic common coin; and
 d) receiving k share-values and, where k>t, assembling out of those a common value, uncovering a bit out of the common value, comparing the bit to the pre-vote value and repeating the steps starting from i) using the bit as the pre-vote value if the pre-vote values were different.

21. Method for generating an unpredictable bit in an asynchronous network comprising n participating network devices (A, B, C, D), each participating network device performing the following steps:
 providing a secret-value ($x_A$, $x_B$, $x_C$, $x_D$) and choosing a common number (g) from a cryptographic group (G) corresponding to a linear secret sharing scheme, deriving a share-value ($g^{x_A}$, $g^{x_B}$, $g^{x_C}$, $g^{x_D}$) by raising the chosen common number (g) to the power of a monotone function f of the secret-value ($x_A$, $x_B$, $x_C$, $x_D$);
 broadcasting to the participating network devices (A, B, C, D) the share-value ($g^{x_A}$, $g^{x_B}$, $g^{x_C}$, $g^{x_D}$);
 receiving the share-values ($g^{x_A}$, $g^{x_B}$, $g^{x_C}$, $g^{x_D}$) from the participating network devices (A, B, C, D) and assembling therefrom a common value by combination of at least two of the share-values ($g^{x_A}$, $g^{x_B}$, $g^{x_C}$, $g^{x_D}$) in the exponent of the common number (g); and
 uncovering a binary value of the common value.

22. Method according to claim 21, whereby a two threshold coin is used, where t is the maximum number of traitors in the asynchronous network and k, with n>k>t, the number of participating network devices needed to obtain the two threshold coin.

23. Method according to claim 21, whereby the received share-values ($g^{x_B}$, $g^{x_C}$, $g^{x_D}$) from the other participating network devices are verified for correctness.

* * * * *